US012647857B2

(12) United States Patent
Ji

(10) Patent No.: US 12,647,857 B2
(45) Date of Patent: Jun. 2, 2026

(54) IDENTIFYING NEIGHBOR ACCESS NODES IN A WIRELESS NETWORK

(71) Applicant: T-Mobile Innovations LLC, Overland Park, KS (US)

(72) Inventor: Rongjie Ji, Lisle, IL (US)

(73) Assignee: T-Mobile Innovations, LLP, Overland Park, KS (US)

( * ) Notice: Subject to any disclaimer, the term of this patent is extended or adjusted under 35 U.S.C. 154(b) by 293 days.

(21) Appl. No.: 18/476,620

(22) Filed: Sep. 28, 2023

(65) Prior Publication Data

US 2025/0113266 A1 Apr. 3, 2025

(51) Int. Cl.
*H04W 36/00* (2009.01)

(52) U.S. Cl.
CPC ............................. *H04W 36/00835* (2018.08)

(58) Field of Classification Search
CPC ............................................... H04W 36/00835
See application file for complete search history.

(56) References Cited

U.S. PATENT DOCUMENTS 10,516,999 B1 12/2019 Desai
11,496,939 B2 11/2022 Subramaniam et al.

11,606,732 B1 * 3/2023 Chandrasekaran ... H04W 48/16
2016/0029253 A1 1/2016 Sarkar et al.
2017/0353978 A1 * 12/2017 Ulinskas ............... H04W 76/10

FOREIGN PATENT DOCUMENTS

WO 2022082144 A2 4/2022

OTHER PUBLICATIONS

Extended European Search Report in copending application No. EP 24202506.2, dated Feb. 20, 2025.

* cited by examiner

*Primary Examiner* — Myron Wyche
(74) *Attorney, Agent, or Firm* — Jones Burke, PLLC

(57) ABSTRACT

Identifying neighbor access nodes in a wireless network includes determining a first region around an antenna of a source access node, the first region bound by a maximum sector distance from the antenna of the source access node within a communication sector of the antenna of the source access node, the source access node being an access node selected from a set of access nodes in a geographic region, determining a second region around the source access node, the second region bound by a maximum circumferential distance from the source access node, the maximum circumferential distance being less than the maximum sector distance, determining a third region around the source access node, the third region bound by the maximum circumferential distance from the source node within the communication sector, and identifying an access node from the set of access nodes as a neighbor access node to the source access node.

18 Claims, 7 Drawing Sheets

100

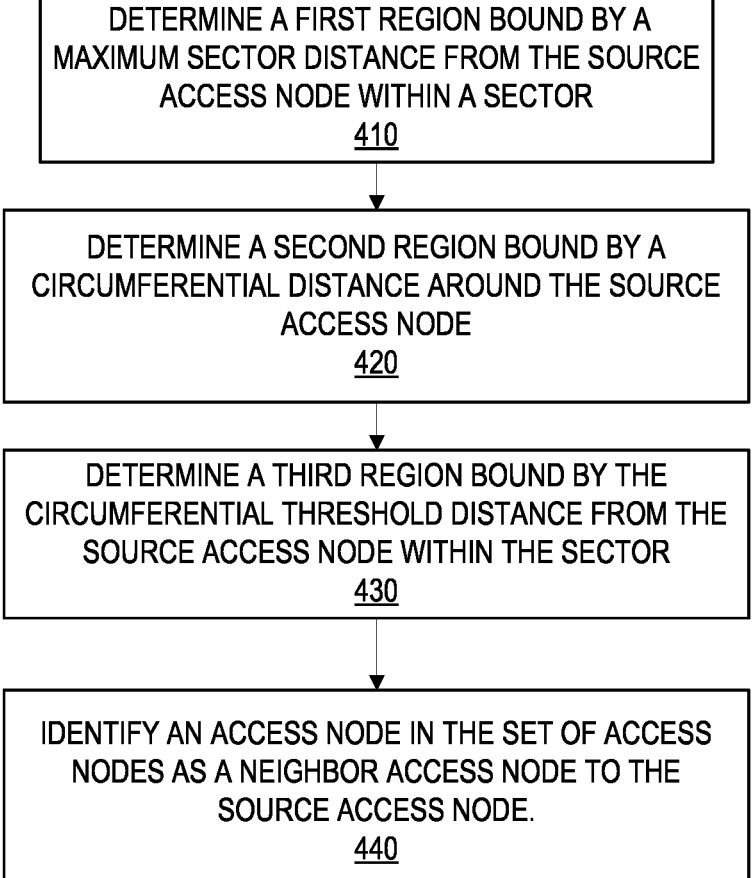

DETERMINE A FIRST REGION BOUND BY A MAXIMUM SECTOR DISTANCE FROM THE SOURCE ACCESS NODE WITHIN A SECTOR
410

DETERMINE A SECOND REGION BOUND BY A CIRCUMFERENTIAL DISTANCE AROUND THE SOURCE ACCESS NODE
420

DETERMINE A THIRD REGION BOUND BY THE CIRCUMFERENTIAL THRESHOLD DISTANCE FROM THE SOURCE ACCESS NODE WITHIN THE SECTOR
430

IDENTIFY AN ACCESS NODE IN THE SET OF ACCESS NODES AS A NEIGHBOR ACCESS NODE TO THE SOURCE ACCESS NODE.
440

FIG. 4

DETERMINE FIRST, SECOND AND THIRD
REGIONS FOR SOURCE ACCESS NODE
510

DETERMINE LOCATION OF
ACCESS NODE
520

ACCESS NODE IN THIRD
REGION?
530

Y

N

ACCESS NODE
IN FIRST OR SECOND
REGION?
550

Y

N

ONE SECTOR
DIRECTED TOWARD
SOURCE ACCESS NODE?
560

N

Y

IDENTIFY ACCESS NODE AS A
NEIGHBOR ACCESS NODE
540

ALL ACCESS NODE
LOCATIONS EVALUATED?
570

N

Y

PROVIDE A LIST OF NEIGHBOR
ACCESS NODES
580

700

| Market | SiteName | SourceName | TargetCell | Distance (Km) | Location | Directed_At_Source |
|--------|----------|------------|------------|---------------|----------|--------------------|
| CL | CL31324A | KCL31324A31 | KCL31324A31 | 0 | co-site | |
| CL | CL31324A | KCL31324A31 | ACL31324A11 | 0 | co-site | |
| CL | CL31324A | KCL31324A31 | ACL31324A21 | 0 | co-site | |
| CL | CL31324A | KCL31324A31 | ACL31324A31 | 0 | co-site | |
| CL | CL31324A | KCL31324A31 | ACL31324A12 | 0 | co-site | |
| CL | CL31324A | KCL31324A31 | ACL31324A22 | 0 | co-site | |
| CL | CL31324A | KCL31324A31 | ACL31324A23 | 0 | co-site | |
| CL | CL31324A | KCL31324A31 | KCL31322B11 | 5.4 | Region 1 | yes |
| CL | CL31324A | KCL31324A31 | KCL31322B21 | 5.4 | Region 1 | yes |
| CL | CL31324A | KCL31324A31 | KCL10025B31 | 1.1 | Region 2 | yes |
| CL | CL31324A | KCL31324A31 | KCL10025B32 | 1.1 | Region 2 | yes |
| CL | CL31324A | KCL31324A31 | KCL10034A11 | 2.7 | Region 2 | yes |
| CL | CL31324A | KCL31324A31 | KCL10034A31 | 2.7 | Region 2 | yes |
| CL | CL31324A | KCL31324A31 | ACL10034A11 | 2.7 | Region 2 | yes |
| CL | CL31324A | KCL31324A31 | ACL10034A31 | 2.7 | Region 2 | yes |
| CL | CL31324A | KCL31324A31 | KCL10039F11 | 3.4 | Region 3 | yes |
| CL | CL31324A | KCL31324A31 | KCL10039F01 | 3.4 | Region 3 | yes |
| CL | CL31324A | KCL31324A31 | ACL10039F11 | 3.4 | Region 3 | no |
| CL | CL31324A | KCL31324A31 | ACL10039F21 | 3.4 | Region 3 | yes |

IDENTIFYING NEIGHBOR ACCESS NODES IN A WIRELESS NETWORK

TECHNICAL BACKGROUND

A wireless network, such as a cellular network, can include a plurality of access nodes (e.g., base stations), with each access node serving multiple wireless devices or user equipment (UE) in a geographical area covered by a radio frequency (RF) transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). As access nodes have evolved, wireless networks may include a combination of multiple access nodes such as 4G LTE evolved NodeBs (eNodeBs) and 5G NR next generation NodeBs (gNodeBs) or alternatively may be exclusively 4G or 5G cellular systems. Wireless devices closer to a 5G antenna are more likely to receive the benefits of the 5G technology.

As wireless networks evolve and grow, there are ongoing challenges in providing high quality service to increasing numbers of wireless devices in various coverage areas of the wireless network. For example, it is important that a wireless device is transferred, or handed over, from communication with its current access node to communication with a new access node, referred to as a neighbor access node, that is capable of maintaining a high quality of service as the wireless device moves out of the geographic area served by its current access node. Current approaches are typically limited only to identifying neighbor access nodes based solely on geographic distance. In other words, a neighbor access node may simply be identified as an access node that is closest in distance to the current access node currently used by the wireless device. However, these approaches may not consider other factors associated with, for instance, transmission characteristics of the signals of the access nodes. Further, some of these approaches limit the determination and identification of the nearest neighbor access node based on the type of RAT that is utilized. The use of these and similar approaches for identifying neighbor access nodes may not result in maintaining the quality of service required for user devices in the wireless network, particularly as part of a handover between access nodes.

Accordingly, a solution is needed for improving the identification of neighbor access nodes in a wireless network in order to maintain a quality of service for user devices.

OVERVIEW

Examples described herein include methods, systems, and processing nodes for identifying neighbor access nodes in a wireless network. An exemplary method for identifying neighbor access nodes in a wireless network includes determining a first region around an antenna of a source access node, the first region bound by a maximum sector distance from the antenna of the source access node within a communication sector of the antenna of the source access node, the source access node being an access node selected from a set of access nodes in a geographic region, determining a second region around the source access node, the second region bound by a maximum circumferential distance from the source access node, the maximum circumferential distance being less than the maximum sector distance, determining a third region around the source access node, the third region bound by the maximum circumferential distance from the source node within the communication sector, and identifying an access node from the set of access nodes as a neighbor access node to the source access node.

An exemplary system for identifying neighbor access nodes in a wireless network includes a set of access nodes located in a geographic region and a processing node communicatively coupled to the access nodes. The processing node is configured to perform operations including determining a first region around an antenna of a source access node, the first region bound by a maximum sector distance from the antenna of the source access node within a communication sector of the antenna of the source access node, the source access node being an access node selected from a set of access nodes in a geographic region, determining a second region around the source access node, the second region bound by a maximum circumferential distance from the source access node, the maximum circumferential distance being less than the maximum sector distance, determining a third region around the source access node, the third region bound by the maximum circumferential distance from the source node within the communication sector, and identifying an access node from the set of access nodes as a neighbor access node to the source access node.

An exemplary non-transitory computer readable medium is provided for identifying neighbor access nodes in a wireless network. The non-transitory computer readable medium stores instructions to perform multiple operations. The operations include determining a first region around an antenna of a source access node, the first region bound by a maximum sector distance from the antenna of the source access node within a communication sector of the antenna of the source access node, the source access node being an access node selected from a set of access nodes in a geographic region, determining a second region around the source access node, the second region bound by a maximum circumferential distance from the source access node, the maximum circumferential distance being less than the maximum sector distance, determining a third region around the source access node, the third region bound by the maximum circumferential distance from the source node within the communication sector, and identifying an access node from the set of access nodes as a neighbor access node to the source access node.

BRIEF DESCRIPTION OF THE DRAWINGS

FIG. 4 illustrates an exemplary method for identifying neighbor access nodes in a wireless network.

FIG. 7 illustrates an exemplary screenshot from a user interface used as a part of identifying neighbor access nodes in a wireless network.

DETAILED DESCRIPTION

Figure 1:
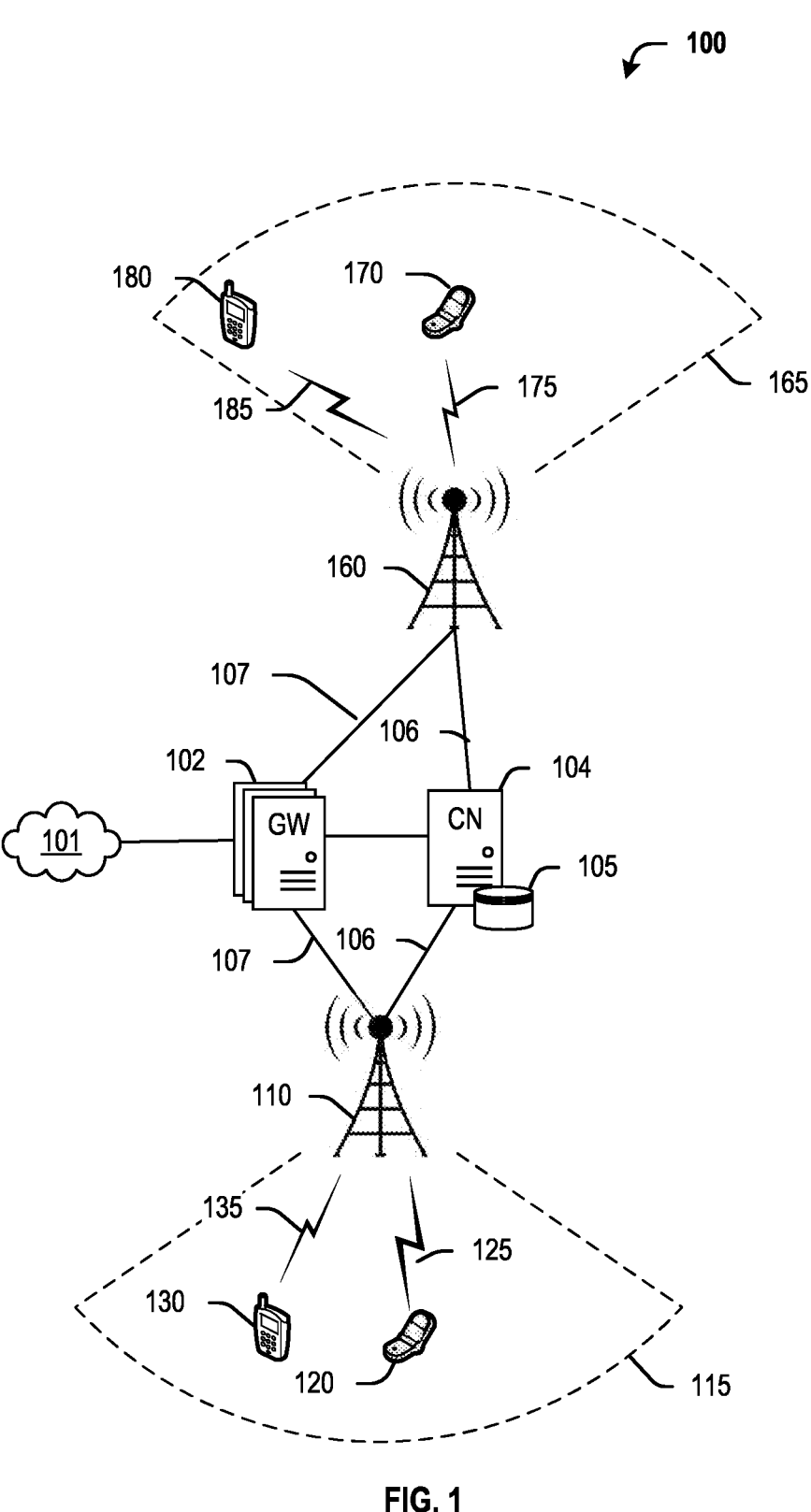
FIG. 1 illustrates an exemplary system for identifying neighbor access nodes in a wireless network.

The disclosed examples illustrate methods, systems, computer readable mediums for identifying neighbor access nodes in a wireless network that includes a set of access nodes by determining a set of geographic regions around a selected source access node and identifying one or more of the access nodes in the set of access nodes as a neighbor access node to the source access node. Each of the access nodes may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennae arranged in one or more arrays, wherein each antenna array is configured to communication with a plurality of wireless devices over a geographical region referred to herein as a communication sector. For example, a first region can be bound by a maximum sector distance from an antenna of the source access node within a communication sector associated with the antennae of the source access node. A second region can be bound by a maximum circumferential distance from the source access node that is less than the maximum sector distance. A third region can be bound by the maximum circumferential distance from the source node within the communication sector. In examples, the access nodes may be identified as neighbor access based on their location in relation to the regions as well as, in some cases, the relative orientation of the antennae and/or communication sectors associated with the antennae between the access nodes and the source access node.

The identification of neighbor access nodes in a wireless network can have an impact on the operational performance of the wireless network. For example, when a wireless device moves out of the geographic area served by its current access node, which can be referred to as the source access node, it is important that the neighbor access node with which the wireless device will initiate communication be capable of maintaining a quality of service that is at least similar the quality of service for the current access node. Current approaches often limit the identification of a neighbor access node to an access that is located closest to the current access node. The examples described herein allow the current access node to select from a set of neighbor access nodes that have been identified in a manner that is different than current approaches. As a result, the current access node may be able to select a neighbor access node capable of maintaining a quality of service that would not have been identified using current approaches.

Similar operations may be performed by an exemplary system described herein and comprising at least a processing node and a processor coupled to the processing node. The processing node can be communicatively coupled to any other network node within the wireless network, such as an access node or a controller node. These and other examples are further described herein and with reference to FIGS. 1-7.

FIG. 1 depicts an exemplary system 100 for identifying neighbor access nodes in a wireless network. System 100 comprises a communication network 101, gateway node 102, controller node 104, access nodes 110 and 160, and wireless devices 120, 130, 170. and 180. Collectively, gateway node 102, controller node 104, access node 110, and access node 160 may be referred to as network nodes. Access node 110 and access node 160 may include an access node of any type, including macrocell access nodes such as Long-Term-Evolution (LTE) eNodeBs or 5G New Radio (NR) gNodeBs, mini access nodes, home eNodeBs or gNodeBs, etc.

Each one of access nodes 110 and 160 may include a plurality of antennae arranged in one or more arrays, wherein each antenna array is configured to steer or form one or more beams to wireless devices attached thereto, including wireless devices 120, 130. Access node 110 communicates with wireless devices 120, 130 over corresponding wireless communication links 125, 135 located within a communication sector 115. Similarly, access node 160 communicates with wireless devices 170 and 180 over corresponding wireless communication links 175 and 185 within a communication sector 165. The area of coverage for communication sectors 115 and 165 can be determined by characteristics for the antennae used in access nodes 110 and 160. The wireless communication links 125, 135, 175, and 185 can include direct communication links, formed beams, multiple-input-multiple-output (MIMO), and so on.

System 100 is shown having two access nodes 110 and 160 in geographic proximity to each other. As such, access nodes 110 and 160 may be referred to as a set of access nodes in a geographic area. Further, access node 110 and access node 160 are shown operating one communication sector 115 and 165, respectively. Communication sectors 115 and 165 have no overlapping geographic region, and the communication sectors 115 and 165, and thus the antennae for the access nodes 110 and 160, are not directed towards each other. In other examples, the communication sector 115 for access node 110 and the communication sector 155 for access node 110 may have an overlapping geographic region and/or may be direct toward each other. In some examples, access node 110 and/or access node 160 may include antennae configured to communicate over corresponding wireless communication links in more than one communication sector. In some examples, more than two access nodes may be present within the geographic area.

As described herein, a network node (e.g., gateway node 102 or controller node 104) communicatively coupled to other network nodes (e.g., access nodes 110, 160) within system 100 can be configured to identify neighbor access nodes in the wireless network. As part of the identification, a first region around an antenna of a source access node is determined. The source access node is selected from the set of access nodes (e.g., access nodes 110, 160) in a geographic area. The first region is bound by a maximum sector distance from the antenna of the source access node within a communication sector of the antenna of the source access node. A second region around the source access node is determined. The second region is bound by a maximum circumferential distance from the source access node and has a maximum circumferential distance that is less than the maximum sector distance. A third region around the source access node is determined. The third region is bound by the maximum circumferential distance from the source node within the communication sector. In other words, the third region is determined as the region representing the intersection of the first region and the second region. As such, the first region and the second region further exclude the third region. Using the first region, second region, and third region, an access node is identified as a neighbor access node to the source access node.

Further, system 100 can be configured to identify an access node from the set of access nodes as a neighbor access node by determining if the access node is located in the third region and identifying the access node as a neighbor access node if it is determined that the access node is in the third region. System 100 can also be configured to identify an access node from the set of access nodes as a neighbor access node by determining if the access node is located in one of the first and second regions if the access node is not located in the third region. If the access node is located in one of the first region and the second region, further determining if a communication sector of the access node is directed towards the source access node and identifying the access node as a neighbor access node to the source access node if it is determined that the communication sector of the access node is directed towards the source access node.

Access node 110 and access node 160 can be any network node configured to provide communication between wireless devices (e.g., wireless devices 120, 130 and 170, 180 respectively) and communication network 101, including standard access nodes and/or short range, low power, small access nodes. For instance, access node 110 and/or access node 160 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an example, a macrocell access node can have a coverage area in the range of approximately five kilometers to thirty five kilometers and an output power in the tens of watts. In other examples, one or both of access node 110 and access node 160 can be a small access node including a microcell access node, a picocell access node, a femtocell access node, or the like such as a home NodeB or a home eNodeB device.

Access nodes 110 and 160 can comprise processors and associated circuitry to execute or direct the execution of computer-readable instructions to perform operations such as those further described herein. Briefly, access nodes 110 and 160 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110 and 160 can receive instructions and other input at a user interface. Access node 110 and access node 160 communicate with gateway node 102 and controller node 104 via communication links 106, 107. Access node 110 and/or access node 160 may communicate with other access nodes (not shown) using a direct link such as an X2 link or similar.

Wireless devices 120, 130, 170, and 180 may be any device, system, combination of devices, or other such communication platform capable of communicating wirelessly with access node 110 and access node 160, respectively, using one or more frequency bands deployed therefrom. Wireless devices 120, 130, 170, and 180 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130, 170, and 180. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an example, controller node 104 includes a database 105 for storing information, such as signaling capabilities and historical signal conditions for wireless devices attached to access node 110 and/or access node 160, default operational parameters. such as frequencies or carrier spacings, for communication sectors deployed by access node 110 and/or access node 160, and so on. This information may be requested by or shared with access node 110 and/or access node 160 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, for example, between access nodes 110 and 160 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
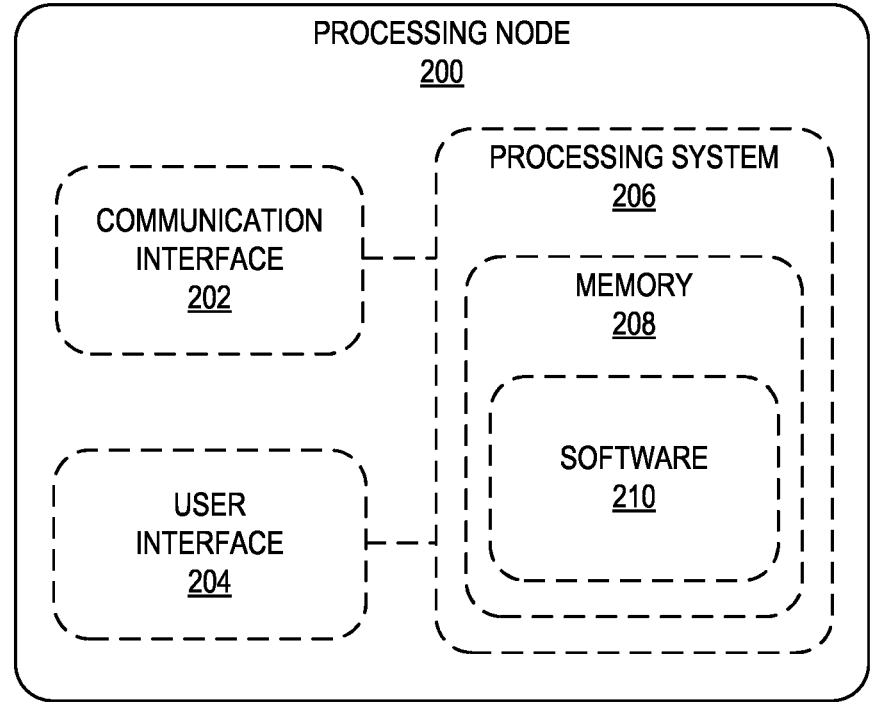
FIG. 2 illustrates an exemplary processing node used in a system for identifying neighbor access nodes in a wireless network.

FIG. 2 depicts an exemplary processing node 200 for identifying neighbor access nodes in a wireless network. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store software 212, which may be executed to perform the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an example, software 212 includes instructions that enable processing node 200 to perform operations for identifying neighbor access nodes in a wireless network. The instructions determine a first region, a second region, and a third region around an antenna of a source access node. The first region extends within a communication sector associated with one or more antennae to a maximum sector distance. The second region extends to a maximum circumferential distance around the source access node, with the maximum circumferential distance being less than the maximum sector distance. The third region extends to the maximum circumferential distance within the communication sector associated with the antennae of the source access node.

In some examples, the maximum sector distance from the source access node within the communication sector may be determined by calculating an average distance from the source access node for a subset of the remaining access nodes in the set of access nodes in the geographic area that are located in the communication sector. Further, the maximum sector distance from the access node within the communication sector cannot exceed a maximum value for a distance from the access node in the communication sector, often referred to as the communication limit for the communication sector. For example, the maximum value may be 31 kilometers (Km).

In some examples, the maximum circumferential distance may be less than or equal to half the maximum sector distance. Further, the maximum circumferential distance may not be greater than a circumferential limit distance from the source access node. For example, the circumferential limit distance may be five Km.

Communication interface 202 further includes instructions that enable processing node 200 to identify an access node from the set of access nodes as a neighbor access node. In some examples, the instructions may determine if the access node is located in the third region and identify the access node as a neighbor node if the access node is located in the third region. The instructions may additionally determine if the access node is located in one of the first region and the second region and one or more antennae and/or communication sectors for the access node are directed or pointed towards the source access node. The instructions may further identify the access node as a neighbor if the access node is located in either the first or second region and directed towards the source access node.

Figure 3:
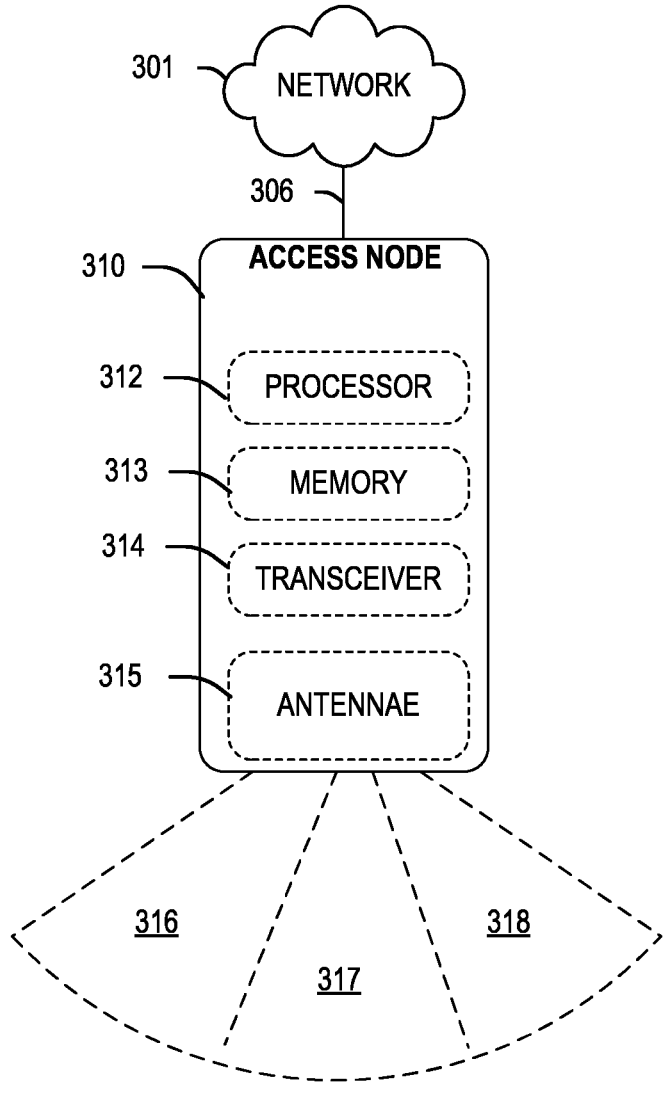
FIG. 3 illustrates an exemplary access node used in a system for identifying neighbor access nodes in a wireless network.

FIG. 3 depicts an exemplary access node 310 for use in conjunction with identifying neighbor access nodes in a wireless network. Access node 310 may be configured as an access point for providing network services from network 301 to end-user wireless devices via a radio-air interface deployed therefrom. Access node 310 is illustrated as comprising a processor 312, a memory 313 (for storing instructions that are performed by processor 312), a transceiver 314, and antennae 315 for deploying a radio air interface over communication sectors 316, 317, and 318. One transceiver and set of antennae are illustrated herein solely to simplify the written description, and it may be evident to those having ordinary skill in the art, that any combination of transceivers and antennae may be incorporated in order to deploy different communication sectors that are configured to facilitate wireless communication with other network nodes on network 301. For example, antennae 315 may include a first directional antenna for communicating wireless signals in communication sector 316, a second directional antenna for communicating wireless signals in communication sector 317, and a third directional antenna for communicating wireless signals in communication sector 318. Further, access node 310 is communicatively coupled to network 301 via communication interface 306, which may be any wired or wireless link as described above.

In an example, access node 310 may be communicatively coupled via interface 306 to a processor node (e.g., processor node 200) over network 301, with the processor node configured to perform operations for identifying neighbor access nodes in a wireless network. In some examples, access node 310 may provide information regarding its location in the geographic area as well as any updates to operational parameters, such as changes to the configuration of the antennae or changes to the communication sectors associated with the antennae. In addition, or as an alternative, the processing node may send instructions over network 301 to access node 310 to request that it provide location information and/or updates for its operational parameters. In some examples, access node 310 may receive information from the processor node regarding the identification of neighbor access nodes. The information may include which access nodes have been identified as neighbor access nodes when access node 310 is operating as a source access node. The information may provide information containing the access nodes to which access node 310 has been identified as a neighbor access node when those access nodes are operating as a source access node.

FIG. 4 illustrates an exemplary method for identifying neighbor access nodes in a wireless network. The method will be discussed with reference to the exemplary communication system 100 illustrated in FIG. 1. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 410, a first region around one or more antennae of the source access node is determined. The antennae are associated with a communication sector for a source access node. The first region is bound by a maximum sector distance from the antennae communication sector within the communication sector. The source access node is selected from a set of access nodes in an area. The set of access nodes may include an access node of any type, including macrocell access nodes such as Long-Term-Evolution (LTE) eNodeBs or 5G New Radio (NR) gNodeBs, mini access nodes, home eNodeBs or gNodeBs, etc. Further the type of source access node may be different from other access nodes in the set of access nodes. In addition, if the selected source access node includes multiple operational parameters, such as multiple antennae and/or multiple communication sectors, as described above, then a set of operational parameters, such as a communication sector associated with one or more antennae can also be selected. In some examples, the source access node may be selected by a user through a user interface in a processor node as described above.

In some examples, the maximum sector distance from the source access node within the communication sector used for the first region may be determined by calculating an average distance from the source access node for a subset of the remaining access nodes in the set of access nodes that are located in the communication sector. Further, the maximum sector may not be greater than a maximum value for a distance from the access node in the communication sector, such as the communication limit for the communication sector.

At 420, a second region around the source access node is determined. The second region is bound by a maximum circumferential distance from the source access node with the maximum circumferential distance being less than the maximum sector distance. In some examples, the maximum circumferential distance may be less than or equal to one half of the maximum sector distance. Further, the maximum circumferential distance is further determined as less than or equal to one half of the maximum sector distance for any value of the maximum circumferential distance less than or equal to a second maximum distance from the source access node, such as the circumferential limit distance.

At 430, a third region around the source access node is determined. The third region is bound by the maximum circumferential distance from the source node within the communication sector. At 440, an access node from the set of access nodes is identified as a neighbor access node. The type of access node identified as a neighbor access node may be different from the source access node. In some examples, all or a portion of the method described in FIG. 4 may further be repeated in order to identify additional access nodes from the set of access nodes as neighbor access nodes.

Figure 5:
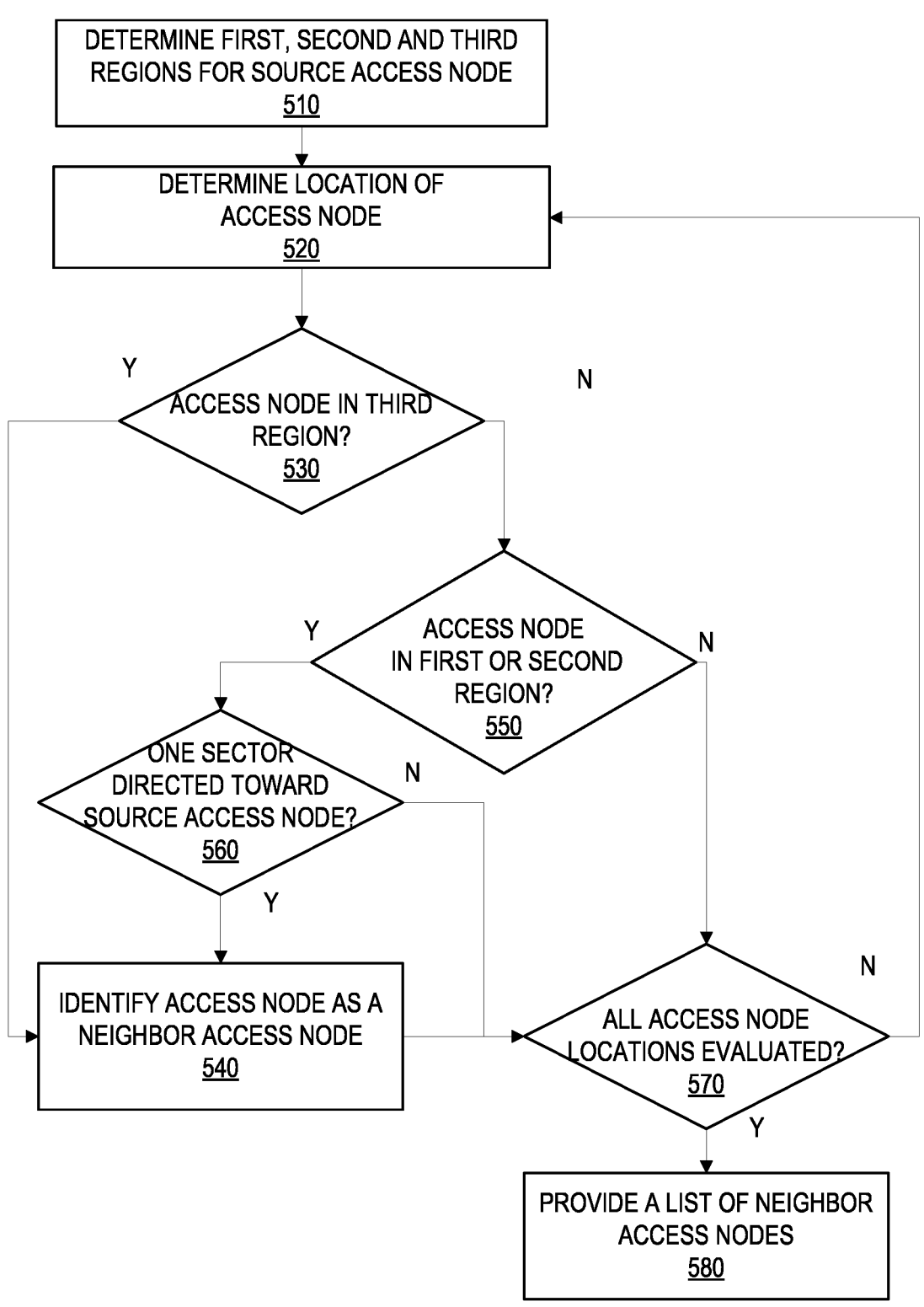
FIG. 5 illustrates another exemplary method for identifying neighbor access nodes in a wireless network.

FIG. 5 illustrates another exemplary method for identifying neighbor access nodes in a wireless network. The method will be discussed with reference to the exemplary communication system 100 illustrated in FIG. 1. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 510, a first region, a second region, and a third region associated with an antenna and/or a communication sector for a source access node in a geographic area is determined. The regions can be determined, and the source access node selected from a set of access nodes in a geographic area in a manner similar to that described above.

Further, at 520, a location of an access node from the set of access nodes in the geographic area is determined. The location may be determined using information already available in the processing node. Alternatively, the processing node may query the access node to provide location information.

At 530, a determination is made as to whether the location of the access node in 520 is in the third region associated with the source access node. If, at 530, the location of the access node is determined to be in the third region, then, at 540, the access node is identified as a neighbor access node to the source access node.

If, at 530, the location of the access node is determined to be in the third region, then, at 550, a determination is made as to whether the location of the access node in 520 is in either the first region or the second region associated with the source access node. If, at 550, the location of the access node is determined to be in either the first region or the second region, then, at 560, a determination is made as to whether the access node has at least one antenna pointed in the direction of the source access node. The determination may be made using information already available in the processing node or the processing node may query the access node to provide operating parameter information, such as position or orientation of communication sectors and/or antennas. If, at 560, the access node is determined to have at least one antenna pointed in the direction of the source access node, then, at 540, the access node is identified as a neighbor access node to the source access node.

If, at 550, the location of the access node is determined to not be in either the first region or the second region, or if, at 560, the access node is determined to not have at least one antenna pointed in the direction of the source access node, then, at 570, a determination is made as to whether the locations of all of the remaining access nodes have been evaluated as to whether they are in one of the three regions.

If, at 570, the locations of all remaining access nodes in the set of access nodes have been evaluated at 530, 550, and/or 560, then, at 580, a list of neighbor access nodes to the source access nodes is provided. The list of neighbor access nodes may be provided for display to a user through a user interface in a processor node. The list of neighbor access nodes may, in addition or as an alternative, be stored in a memory in processor node for future use and/or evaluation. Further, information as to which access nodes have been identified as neighbor access nodes may be communicated from the processor node to the source access node and/or other access nodes in the set of access nodes.

If, at 570, the locations of all of the remaining access nodes in the set of access nodes have been evaluated, then method returns to 520 to determine the location of another access node from the set of access nodes.

Figure 6:
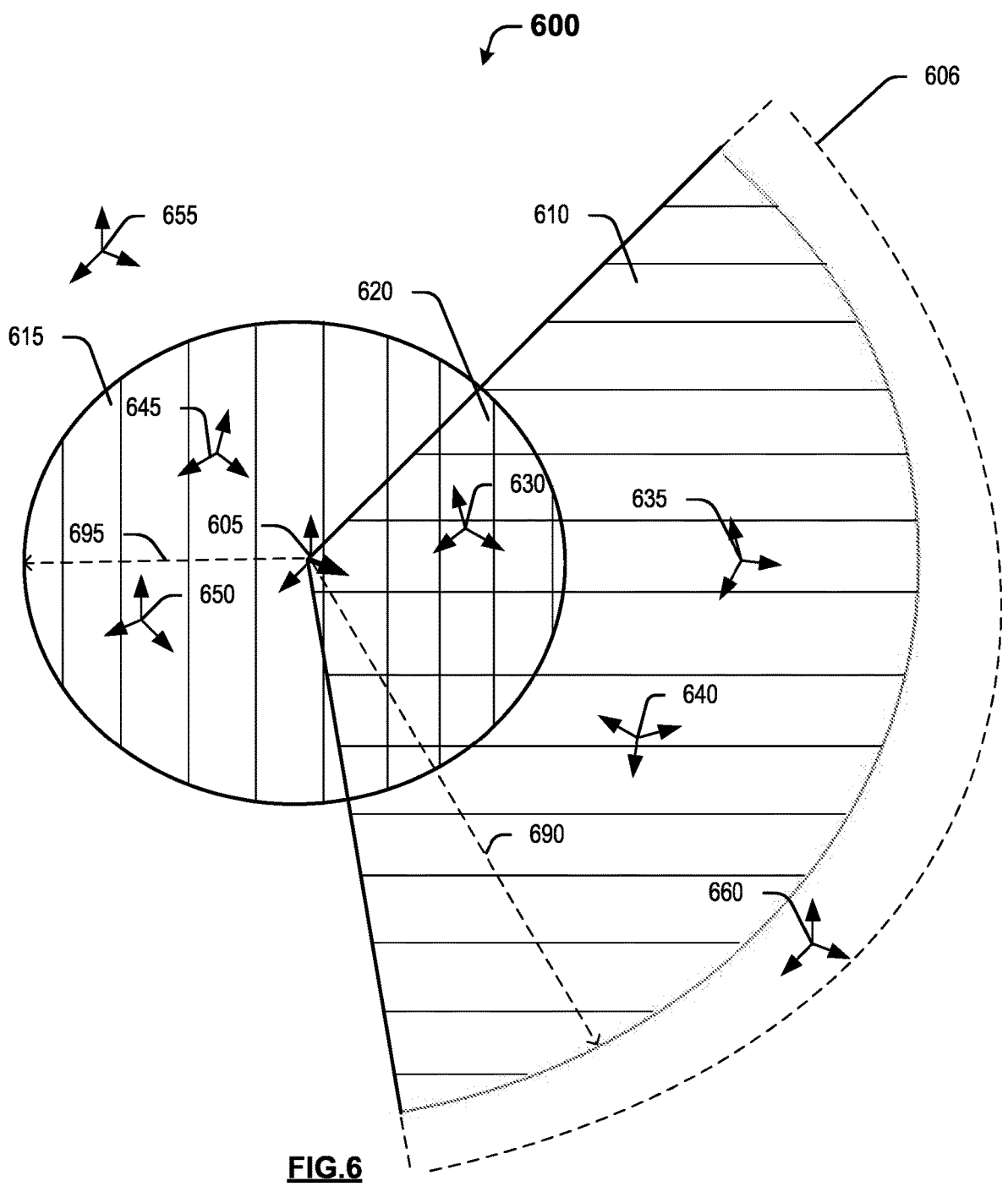
FIG. 6 illustrates an illustrative example of a geographic area that includes a set of access nodes as a part of identifying neighbor access nodes in a wireless network.

FIG. 6 is an illustrative example of a geographic area 600 that includes a set of access nodes in a wireless network. Each of the set of access nodes labeled 605, 630, 635, 640, 645, 650, 655, and 660, may comprise a gNb or similar access node as described above, and may include a plurality of antennae arranged in one or more arrays, wherein each antenna array is configured communicate with wireless devices in one or more communications sectors associated with the access nodes. A source access node 605, selected from the set of access nodes, is shown with an arrow diagram to indicate the orientation of its communication sector 606. A first region 610 is extended a distance labeled 690 from source access node 605 within the boundary of communication sector 606. First region 610 may be a 'Front Far Zone' where all cells antenna azimuth pointing to serving cell 605 count as neighbors. A second region 615 is extended a distance labeled 695 circumferentially around source access node 605. Second region 615 may be an 'Other Near Zone' where all cells antenna azimuth pointing to serving cell 605 count as neighbors The distance 690 and distance 695 may be determined in a manner similar to that described above. Notably, distance 690 is less than the maximum distance, or communication limit distance, for communication sector 606. A third region 620 is extended a distance 695 within the boundary of communication sector 606. Third region 620 'Front Near Zone' may be all where cells are counted as neighbors to serving cell 605.

In other words, the third region 620 includes the portion of first region 610 that overlaps with second region 615.

The set of access nodes further include access nodes 630, 635, 640, 645, 650, and 655 at different locations within the geographic area 600. The information, such as locations, for the access nodes have been processed using the methods described in FIG. 4 and/or FIG. 5 above to identify a subset of the access nodes that are neighbor access nodes to source access node 605. Access node 630 is located within the third region and is identified as a neighbor access node. Access node 640 is located in the first region. Further, the communication sector of access node 640, as shown by its arrow diagram, is directed towards source access node 605. Access node 645 is located in the second region. Further, the communication sector of access node 645, as shown by its arrow diagram, is directed towards source access node 605 and is identified as a neighbor access node. Access nodes 630, 640, and 645 are identified as neighbor access nodes.

Access node 635 is also located in the first region. However, the orientation of the communication sector of access node 635, as shown by its arrow diagram, is not directed towards source access node 605. Access node 650 is also located in the second region. However, the orientation of the communication sector of access node 650, as shown by its arrow diagram, is not directed towards source access node 605. Access node 655 is not located in any of the first, second, or third regions and is not identified as a neighbor access node. Access node 660 is located within communication sector 606 but is not located within the first region. Access nodes 635, 650, 655, and 660 are not identified as neighbor access nodes.

FIG. 7 is an exemplary screenshot 700 from a user interface used as part of identifying neighbor access nodes in a wireless network. Screenshot 700 may be displayed on a display screen or display device included as part of user interface 204 in processing node 200. Screenshot 700 shows a listing of neighbor access nodes identified in a manner as described in method 400 above. Screenshot 700 also shows information associated with each of the identified neighbor access nodes.

Screenshot 700 includes a header row 710 along with a set of rows 790 positioned below header row 710. Each of the set of rows 790 provides information associated with one of the identified neighbor access nodes arranged in columns 720, 730, 740, 750, 760, 770, and 780. The header row 710 includes an identifier for each of the columns 720, 730, 740, 750, 760, 770, and 780. Column 720 is labeled "Market" and identifies the geographic area in which the set of access nodes are located. Column 730 is labeled "SiteName" and identifies the access node that has been selected as the source access node. Column 740 is labeled "SourceName" and identifies the specific operational parameters, such as communication sector and/or antennae, selected for the source access node. As shown, each of rows 790 identifies the "Market" as CL in column 720, the "SiteName" as CL31324A in column 730, and "SourceName" as KCL31324A31 in column 740. Notably, the "SourceName" in column 740 displays the "SiteName" from column 730, which identifies the source access node, along with an added prefix and suffix. In other examples, the "SourceName" may include only a portion of the "SiteName" or may be completely different from the "SiteName".

Column 750 in screenshot 700 is labeled "TargetCell" and identifies neighbor access nodes and corresponding specific operational parameters for the identified neighbor access node, similar to column 740. Each of the set of rows 790 has a different identifier for the "TargetCell" in column 750. However, one or more of the rows may include different operational parameters (e.g., a prefix or suffix) for the same access node in a manner similar to column 730. For example, the "TargetCell" for one of the set of rows 790 is identified as KCL31322B11 while a second one immediately below is identified as KCL31322B21. The identified access node for each of these rows is the same, only the operational parameters (e.g., communication sector and/or antennae identified by the prefix and suffix) are different.

Column 760 in screenshot 700 is labeled "Distance (Km)" and identifies the distance, in Km, between the source access node (i.e., "Source Name") in column 730 and the identified neighbor access node (i.e., "TargetCell") in column 750. Column 770 is labeled "Region" and identifies the region in which the neighbor access node is located, as described above. As shown, Region 1 refers to the first region, region 2 refers to the second region, and region 3 refers to the third region. Column 780 is labeled "Directed_At_Source" and identifies whether the operational parameters for the neighbor access node (i.e., the "TargetCell" identifier), such as the antennae and/or the communication sector associated with the antennae are directed toward the source access node (e.g., "SourceName" identifier).

Notably, a subset of rows 790 are identified as co-site in column 770. A "TargetCell" from column 750 that is identified as co-site indicates the presence of another configuration of operational parameters within the source access node (i.e., "SourceName") identified in column 740. As such, the identifier for these rows in column 780 is omitted. In some instances, these may be used as neighbor access sites. Further, the information provided in columns 770 and 780 is consistent with the determinations made with respect to the first, second, and third regions described above. For instance, all of the rows that are identified as Region 1 or Region 2 in column 770 also are identified as yes in column 780. Additionally, one of the rows that is identified as Region 3 in column 770 is additionally identified as no in column 780, as the operational parameters for the neighbor access node (i.e., the "TargetCell" identifier) do not have to be directed toward the source access node when the neighbor access node is located in region 3.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the disclosure. The following claims specify the scope of the disclosure. Note that some aspects of the best mode may not fall within the scope of the disclosure as specified by the claims. Those skilled in the art will appreciate that the features described above can be combined in various ways to form multiple variations of the disclosure. As a result, the disclosure is not limited to the specific examples described above, but only by the following claims and their equivalents.

What is claimed is:

1. A method for identifying neighbor access nodes in a wireless network, the method comprising:
   determining a first region around an antenna of a source access node, the first region bound by a maximum sector distance from the antenna of the source access node within a communication sector of the antenna of the source access node, the source access node being selected from a set of access nodes in a geographic region;
   determining a second region around the source access node, the second region bound by a maximum circumferential distance from the source access node, the maximum circumferential distance being less than or equal to one half the maximum sector distance;
   determining a third region around the source access node, the third region bound by the maximum circumferential distance from the source access node within the communication sector; and
   identifying an access node from the set of access nodes as a neighbor access node to the source access node.

2. The method of claim 1, further comprising identifying a set of access nodes in the geographic region.

3. The method of claim 1, wherein the maximum sector distance from the source access node within the communication sector is determined by calculating an average distance from the source access node for a subset of remaining access nodes in the set of access nodes in the geographic region, the subset of the remaining access nodes located in the communication sector.

4. The method of claim 3, wherein the maximum sector distance from the source access node within the communication sector is not greater than a first maximum distance from the access node in the communication sector.

5. The method of claim 4, wherein the maximum circumferential distance is further determined as less than or equal to one half of the maximum sector distance for any value of the maximum circumferential distance less than or equal to a second maximum distance from the source access node.

6. The method of claim 1, wherein identifying the access node as a neighbor access node further comprises:
   determining if the access node is located in the third region;
   identifying the access node as a neighbor access node if it is determined that the access node is in the third region;
   determining if the access node is located in one of the first region and the second region if the access node is not located in the third region;
   determining if a communication sector of the access node is directed towards the source access node if it is determined that the access node is in one of the first region and the second region; and
   identifying the access node as a neighbor access node to the source access node if it is determined that the communication sector of the access node is directed towards the source access node.

7. The method of claim 1, further comprising providing a list of neighbor access nodes after identifying all neighbor access nodes from the set of access nodes.

8. The method of claim 1, wherein the antenna is a directional antenna of the source access node.

9. A system for identifying neighbor access nodes in a wireless network, the system comprising:

a set of access nodes located in a geographic region; and a processing node communicatively coupled to the set of access nodes, the processing node configured to perform operations comprising:

determining a first region around an antenna of a source access node, the first region bound by a maximum sector distance from the antenna of the source access node within a communication sector of the antenna of the source access node, the source access node being selected from a set of access nodes in a geographic region;

determining a second region around the source access node, the second region bound by a maximum circumferential distance from the source access node, the maximum circumferential distance being less than the maximum sector distance;

determining the maximum circumferential distance as less than or equal to one half of the maximum sector distance for any value of the maximum circumferential distance less than or equal to a second maximum distance from the source access node;

determining a third region around the source access node, the third region bound by the maximum circumferential distance from the source access node within the communication sector; and identifying an access node from the set of access nodes as a neighbor access node to the source access node, wherein the maximum sector distance from the source access node within the communication sector is not greater than a first maximum distance from the access node in the communication sector.

10. The system of claim 9, wherein the processing node is further configured to identify a set of access nodes in the geographic region.

11. The system of claim 9, wherein the maximum sector distance from the source access node within the communication sector is determined by calculating an average distance from the source access node for a subset of remaining access nodes in the set of access nodes in the geographic region, the subset of the remaining access nodes located in the communication sector.

12. The system of claim 11, wherein the maximum sector distance from the source access node within the communication sector is not greater than a first maximum distance from the source access node in the communication sector.

13. The system of claim 9, wherein the maximum circumferential distance is further determined as less than or equal to one half of the maximum sector distance for any value of the maximum circumferential distance less than or equal to a second maximum distance from the source access node.

14. The system of claim 9, wherein the processing node is further configured to:

determine if the source access node is located in the third region;

identify the source access node as a neighbor access node if it is determined that the source access node is in the third region;

determine if the source access node is located in one of the first region and the second region if the source access node is not located in the third region;

determine if a communication sector of the source access node is directed towards the source access node if it is determined that the source access node is in one of the first region and the second region; and identify the source access node as a neighbor access node to the source access node if it is determined that the communication sector of the source access node is directed towards the source access node.

15. The system of claim 9, wherein the processing node is further configured to provide a list of neighbor access nodes after identifying all neighbor access nodes from the set of access nodes.

16. A non-transitory computer readable medium, storing instructions executed by a processor to perform operations comprising:

determining a first region around an antenna of a source access node, the first region bound by a maximum sector distance from the antenna of the source access node within a communication sector of the antenna of the source access node, the source access node being selected from a set of access nodes in a geographic region;

determining a second region around the source access node, the second region bound by a maximum circumferential distance from the source access node, the maximum circumferential distance being less than or equal to one half the maximum sector distance;

determining a third region around the source access node, the third region bound by the maximum circumferential distance from the source access node within the communication sector; and identifying an access node from the set of access nodes as a neighbor access node to the source access node.

17. The computer readable medium of claim 16, wherein identifying the access node as a neighbor access node further comprises:

determining if the access node is located in the third region;

identifying the access node as a neighbor access node if it is determined that the access node is in the third region;

determining if the access node is located in one of the first region and the second region if the access node is not located in the third region;

determining if a communication sector of the access node is directed towards the source access node if it is determined that the access node is in one of the first region and the second region; and identifying the access node as a neighbor access node to the source access node if it is determined that the communication sector of the access node is directed towards the source access node.

18. The computer readable medium of claim 16, further comprising providing a list of neighbor access nodes after identifying all neighbor access nodes from the set of access nodes.

* * * * *